(12) United States Patent
Texier

(10) Patent No.: US 6,881,450 B1
(45) Date of Patent: Apr. 19, 2005

(54) APPARATUS AND METHOD FOR MAKING A MAGNETIC COATED MEDIUM, AND A COATED MEDIUM THEREFROM

(76) Inventor: Claude Texier, 23, rue des Fontaines, F-77400 Thorigny sur Marne (FR)

( * ) Notice: Subject to any disclaimer, the term of this patent is extended or adjusted under 35 U.S.C. 154(b) by 0 days.

(21) Appl. No.: 09/743,182

(22) PCT Filed: Jul. 7, 1999

(86) PCT No.: PCT/FR99/01640
§ 371 (c)(1),
(2), (4) Date: Feb. 23, 2001

(87) PCT Pub. No.: WO00/01776
PCT Pub. Date: Jan. 13, 2000

(30) Foreign Application Priority Data

Jul. 7, 1998 (FR) .......................................... 98 08668

(51) Int. Cl.⁷ .............................................. H01F 41/24
(52) U.S. Cl. ...................... 427/550; 427/547; 427/598; 427/128; 427/130; 427/207.1; 427/208.2; 427/361; 427/365
(58) Field of Search ................................ 427/547, 128, 427/550, 598, 130, 385.5, 208.2, 207.1, 365, 361; 118/58, 429

(56) References Cited

U.S. PATENT DOCUMENTS

| | | | |
|---|---|---|---|
| 3,713,236 A | * | 1/1973 | Fields .............................. 40/33 |
| 5,278,275 A | * | 1/1994 | Yatsuka et al. ................ 528/74 |
| 5,637,165 A | * | 6/1997 | Chen .......................... 156/62.2 |
| 5,762,263 A | * | 6/1998 | Chamberlain ................ 229/132 |
| 5,972,438 A | * | 10/1999 | Suzuki et al. ................ 427/548 |

FOREIGN PATENT DOCUMENTS

| | | |
|---|---|---|
| CH | 640256 A | 12/1983 |
| GB | 1444858 A | 8/1976 |
| JP | 05 017709 | 9/1993 |
| WO | WO 9422151 A | 9/1994 |

* cited by examiner

Primary Examiner—Kirsten Jolley
(74) Attorney, Agent, or Firm—Clark & Brody

(57) ABSTRACT

The invention is directed to a method of magnetically linking a ferromagnetic object to a partially magnetized coating material made by applying a coating to a surface of a continuously-moving medium including the steps of providing a coating material by mixing a binder material suitable for being spread substantially and regularly over the surface and a ferromagnetic component, the binder material being a hot melt adhesive; providing a continuously-moving medium having a top surface to be substantially coated, the surface capable of receiving a substantially and regularly spread coating material; passing the coating material and continuously-moving medium between rollers to form a substantially constant thickness of the coating material substantially covering the top surface and allowing the coating material to set to form the coated medium as a magnetizable component, wherein the medium that is coated is one of a paper, a card, wallpaper, a flexible plastic sheet, a rigid plastic sheet, and walls; partially magnetizing the coating material during continuous movement of the medium to create a magnetized area and an unmagnetized area; and magnetically and temporarily linking a ferromagnetic object to the magnetized area so that the coated medium and ferromagnetic object are held together by magnetic attraction.

3 Claims, 1 Drawing Sheet

APPARATUS AND METHOD FOR MAKING A MAGNETIC COATED MEDIUM, AND A COATED MEDIUM THEREFROM

TECHNICAL FIELD

The present invention relates mainly to a magnetic coating, to a method of coating outside surfaces, in particular of sheet materials, and to a coating machine implementing said method.

BACKGROUND

It is known to provide various objects with a magnetized surface to enable them to be fixed temporarily on a ferromagnetic support such as a refrigerator door, an armored door, or the like. Plates of iron have also been used as supports for games containing magnetized pieces, such as chess games. Unfortunately, most surfaces such as walls, pieces of card, or the like, are not capable of retaining magnets. Similarly, flexible magnetic media suitable for being rolled or folded are not commonly available.

SUMMARY OF THE INVENTION

Consequently, an object of the present invention is to provide a method enabling ferromagnetic properties to be given to any medium, and in particular to paper, card, sheets of flexible or rigid plastics material, wallpaper, walls, etc.

Another object of the present invention is to provide a method of magnetizing such media.

Another object of the present invention is to provide electromagnetic shielding serving firstly to confine electromagnetic waves that are given off in a room, and secondly to limit the penetration of electromagnetic waves into said room.

Another object of the present invention is to provide such methods at low cost price.

These objects are achieved by a method of the present invention which comprises a step of mixing ferromagnetic particles with a binder, typically a paint or an adhesive. Advantageously the mixture (weighty, and liquid or semi-liquid) is homogenized before being coated onto a medium. If it is also desired to obtain a surface that is magnetized, a magnetic field is applied to the coated medium having ferromagnetic particles suitable for remaining magnetized when no longer subjected to the action of an external magnetic field.

The invention mainly provides a coating including a binder and suitable for being spread substantially regularly over a surface, the coating being characterized in that it further comprises a ferromagnetic component, in particular an iron oxide.

In an advantageous embodiment of said coating, said binder is an adhesive, in particular a hot-melt adhesive.

In an advantageous disposition of said embodiment, said coating comprises essentially two parts by weight of hot-melt adhesive and six parts by weight of iron oxide.

In another advantageous embodiment of said coating, said binder is a paint.

The invention also provides a method of coating a surface, the method being characterized in that it comprises the following steps:

a) coating a medium, in particular a card medium, in a layer of constant or substantially constant thickness of a coating of the invention and comprising a binder and a ferromagnetic component, in particular an iron oxide; and b) causing the coating spread on the surface to set.

In an advantageous implementation of said method, the coating step is performed in the presence of a coating including a ferromagnetic film corresponding to 200 grams per square meter (g/m$^2$) to 850 g/m$^2$ of iron oxide, and preferably substantially equal to 800 g/m$^2$ of iron oxide.

In another advantageous implementation of said method, it further includes a step c) of magnetizing the ferromagnetic fill of the coating.

In the invention, step c) of magnetizing the ferromagnetic fill advantageously takes place before step b) in which the binder of the coating is caused to set, and the magnetizing magnetic field is strong enough to ensure that magnetic particles in the binder become oriented before the binder sets.

The invention also provides a coating machine for implementing the method of the invention, characterized in that it comprises means 11 for coating a medium 9, in particular a card medium, with a coating of the invention, said machine including means for heating a hot-melt glue and for applying it to said medium 9.

In an advantageous embodiment of said machine, it also has a magnet 15 for magnetizing the coating layer.

The present invention will be better understood from the following description and the accompanying figures given as non-limiting examples and in which:

DETAILED DESCRIPTION OF THE PREFERRED EMBODIMENT

Figure 1:
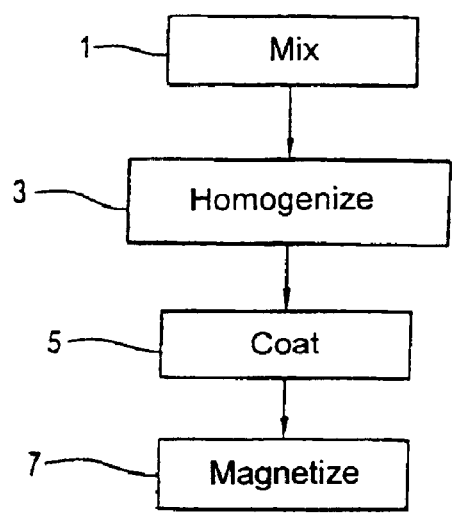
FIG. 1 is a flow chart showing the preferred implementation of the method of the present invention.

FIG. 1 shows the outline of the method of the present invention.

At 1, a binder, typically a paint or an adhesive, is mixed with ferromagnetic particles forming a filler in the binder. A paint is used if the coating of the present invention is to be visible on its medium. Naturally the ferromagnetic particles may alter the color of the paint. If this effect is undesired, it is possible to use paint of the present invention and including a ferromagnetic fill as an undercoat and first coat, and thereafter to cover it with one or more layers of paint not having any ferromagnetic filler.

In an advantageous variant, the binder is an adhesive. Any type of adhesive can be used that is compatible with the ferromagnetic filler used and with the medium to be coated.

The adhesive makes it possible to cause sheet material, e.g. a sheet of optionally decorated paper, a plastics film, or the like to be made to adhere to the medium.

By way of example, it is possible to use adhesives in dispersion, in particular acrylic, vinyl acetate, copolymer of vinyl acetate and acrylic ethylene or styrene, adhesives in solution of the vinyl acetate, acrylic, or acrylic styrene type, vegetable adhesives in particular of the starch type, dextrin, or casein type, or advantageously hot-melt adhesives made in particular on the basis of ethylene vinyl acetate, acrylic ethylene, polyolefin, butadiene styrene, or isoprene styrene.

Naturally, for media that are to be magnetized, the temperature at which hot-melt adhesives are used at the time of magnetization must lie below the Curie temperature of the ferromagnetic material concerned.

For a material that is not to present any remanence, any ferromagnetic material can be used providing it is capable of presenting the desired grain size and the desired stability over time, in particular chemical stability. For example it is possible to use soft iron, quenched iron, ferrite, any iron oxide, ferromagnetic rare earths, samarium, barium, or cobalt.

To provide screening against electromagnetic radiation, it is advantageous for the fill of particles to be sufficient to make the covering of the present invention conductive, at least at the frequencies that are to be eliminated. In a variant, non-ferromagnetic conductive particles are used, e.g. copper particles, in addition to or instead of the ferromagnetic particles for the purpose of forming shielding or a Faraday cage. Such shielding enables electronic equipment, in particular telecommunications equipment and computer equipment, to be protected from external disturbances and also from eavesdropping by preventing the electromagnetic signals given off by equipment of this type in operation from being overheard.

In a variant, iron particles are used that are themselves covered in a material for providing protection against corrosion, e.g. a layer of cobalt. It is also possible to use chromium, chromium oxide, and the particles that are used for coating magnetic tapes.

Advantageously, the amount of electromagnetic filler that is used is the maximum that can be accepted by the binder, for example six units by weight of ferromagnetic powder for two units by weight of binder. For examples 200 grams (g) to 850 g of iron oxide can be deposited per square meter ($m^2$) of card, e.g. 800 $g/m^2$.

Advantageously, the ferromagnetic powder has grains of small size so as to obtain a surface state that is smooth. Excellent results have been obtained with iron oxide having a grain size of 24 micrometers ($\mu m$), and smaller grain sizes are also suitable. If a granular surface state is acceptable, then it is possible to use grains of larger size, e.g. lying in the range 25 $\mu m$ to 300 $\mu m$.

In a first implementation, the ferromagnetic particles are spherical or substantially spherical. In an advantageous variant, the ferromagnetic particles are in the form of elongate rods.

The binder is mixed with the ferromagnetic powder. Mixing can be performed using a binder in liquid or semi-liquid form. Under such circumstances, it is possible to obtain a mixture that is quite uniform. In a variant, mixing is performed between solid particles. Under such circumstances, it is advantageous (as shown at 3) subsequently to perform a homogenizing step, e.g. after a hot-melt adhesive has melted.

The method continues at 5.

At 5, a medium is coated. The medium can be in sheet form, e.g. paper or card, plates of plastics material, or the like. This can be done so as to coat card for making jigsaw puzzles, boards for playing games, books, pictures, wallpaper, or the like. Coating can also be performed on bulky elements which receive the coating of the present invention on at least a portion of their outside surface, e.g. walls, partitions, or the like. If the coating of the present invention is an adhesive, a surface element is placed on the surface to receive the adhesive, e.g. paper carrying a desired pattern. If the product is to be magnetized, a step 7 is performed in which it is subjected to a magnetic field induced by permanent magnets, or advantageously by an electromagnet.

For elements that are to be made ferromagnetic without remanent magnetization, it is possible to use coating devices of conventional type with a surface covering being caused to adhere on one or more faces of the medium, which is typically made of card.

It is possible to cover both faces of a medium, typically made of card or a sheet of plastics material, with the covering of the present invention in such a manner as to enable pieces to be stacked.

In a variant, a first face of the medium receives a non-magnetized covering, with the opposite face receiving a covering suitable for being magnetized.

In a second variant implementation, both faces receive a covering which is subsequently magnetized in permanent manner.

Magnetization can be performed by magnetically polarizing particles held in a binder without moving the particle, either because the magnetic field is not sufficiently intense, or because the adhesive has already dried and opposes any displacement or turning of the particles. In an advantageous variant, the covering of the present invention is subjected to an intense magnetic field before the adhesive sets, i.e. before the particles are prevented from moving, so as to orient the particles in the magnetic field, and then once the adhesive has set the particles are held in this position which corresponds to a strong remanent magnetic field. This variant is particularly advantageous when using a magnetic powder made up of particles in the form of rods. Under such circumstances, it is particularly advantageous to use a hot-melt adhesive so that it is easy to control setting thereof.

Figure 2:
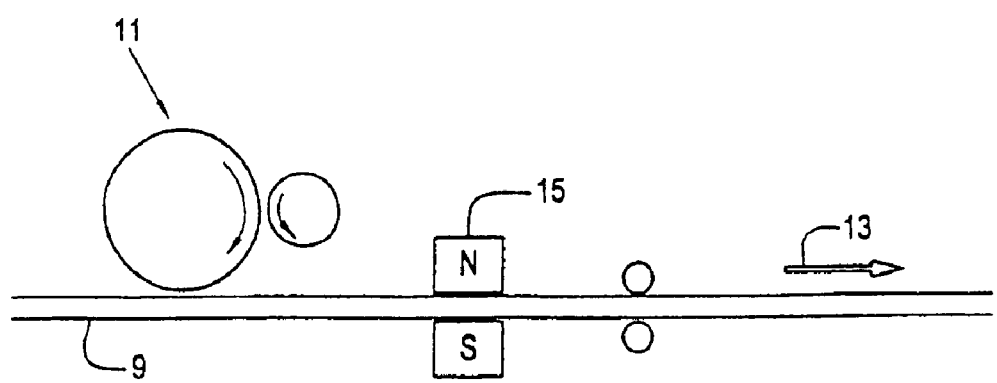
FIG. 2 is a diagrammatic side view of a coating machine of the present invention.

FIG. 2 is a diagram of a device for applying adhesive and magnetizing card. The device shown is a single face device but naturally double-face devices would not go beyond the ambit of the present invention.

The card 9 passes beneath a machine 11 for dispensing hot-melt adhesive. The machine 11 can be a nozzle type machine or advantageously a roller type machine, for example a machine including a 3960 Multiscan® sold by Nordson and connected via 2.40 meter long automatic heating hoses to automatic guns sold by the same company under the reference H20. The fluid coating (hot when a hot-melt adhesive is used) is inserted, for example, between two rollers and flows through a calibrated gap left between the rollers. The hot adhesive containing ferromagnetic particles is deposited on the card 9 travelling in the direction of arrow 13 at a speed that can lie in the range 20 meters per minute (m/min) to 250 m/min, and preferably lying in the range 30 m/min to 150 m/min.

Advantageously, before the adhesive sets, while the particles can still move in the coating of the present invention, the coated card passes through the airgap of a magnet or an electromagnet 15 that generates a magnetic field that is substantially uniform over the entire width of the card. On coming up to the magnet 15, the coating of the present invention has a temperature that is below the Curie temperature of the material constituting the ferromagnetic particles. By way of example, a permanent magnet 15 is used which generates a magnetic field of 0.4 Teslas over an area of 1.10 m×1.70 m. In a variant, an air- or water-cooled electromagnet is used, e.g. generating a magnetic field that is substantially equal to 0.5 Teslas. It should be observed that the viscosity of the covering of the present invention in the vicinity of the elements 15, and the amplitude of the magnetic field are such as to ensure that the magnetic particles do not migrate out from the binder and stick in the gap between the elements 15. Similarly, guide means (not shown) prevent the card 9 covered in the covering of the present invention from coming to stick against one of the poles of the magnet 15.

Advantageously, the device of FIG. 2 also has means (not shown) for depositing sheet material, typically paper, so as to cover the surface of the card. The paper can have printing of various kinds thereon and it can be put into place before or after the magnetic field is applied by the magnet 15.

The device of FIG. 2 advantageously includes means for cutting the card 9 (not shown). Naturally, the present invention is not limited to means for continuous application of adhesive and also applies to means that apply adhesive discontinuously, sheet by sheet. A machine can apply adhesive to 90 cards per minute, for example, with each card having a surface area of 40 cm by 155 cm.

It is also possible, particularly when applying adhesive discontinuously, to deposit the covering in predefined zones only or to magnetize certain zones only so as to cause magnets to attach only in said predefined zones which also receive special marking, e.g. corresponding to the correct answers to questions printed on the visible face of the medium. Magnetization in zones can be obtained by the airgaps of the magnet 15 having the shape of the desired zones, or by employing a set of electromagnets disposed as a matrix and powering only those electromagnets which are in register with zones that are to be magnetized.

The method of the invention also makes it possible to match the thickness of the coating as a function of the weight per unit area of the two sheets to be stuck together. For example, backing a sheet having a weight of 90 g onto a sheet of the same thickness or greater thickness requires about 90 g to 120 g of coating. The magnetized coating of the magnet can also be adapted under the same conditions. In other words, the thickness of the coating can perfectly well be adapted to match the appearance, the weight, the magnetization force, and the cost price that are desired for it.

The present invention also applies to making games, in particular jigsaw puzzles, board games, educational games, wall coverings for removable retention of decorative elements or signs (by means of magnets), and the like.

The present invention applies mainly to the papermaking and building industries.

What is claimed is:

1. A method of magnetically linking a ferromagnetic object to a partially magnetized coating material made by applying a coating to a surface of a continuously-moving medium comprising the steps of:

a) providing a coating material by mixing a binder material suitable for being spread substantially and regularly over the surface and a ferromagnetic component, the binder material being a hot melt adhesive;

b) providing a continuously-moving medium having a top surface to be substantially coated, the surface capable of receiving a substantially and regularly spread coating material; and c) passing the coating material and continuously-moving medium between rollers to form a substantially constant thickness of the coating material substantially covering the top surface and allowing the coating material to set to form the coated medium as a magnetizable component, wherein the medium that is coated is one of a paper, a card, wallpaper, a flexible plastic sheet, a rigid plastic sheet, and walls; and d) partially magnetizing the coating material during continuous movement of the medium to create a magnetized area and an unmagnetized area; and e) magnetically and temporarily linking a ferromagnetic object to the magnetized area so that the coated medium and ferromagnetic object are held together by magnetic attraction.

2. The method of claim 1, wherein the ferromagnetic component is iron oxide, and a ferromagnetic fill of the coated surface ranges between 200 and 850 grams of iron oxide per square meter of coated medium surface.

3. The method of claim 1, wherein the magnetizing step occurs before the coating material sets, and a magnetizing magnetic field used for the magnetizing step is strong enough to orient the ferromagnetic component in the coating material before the coating material sets.

* * * * *